US011982418B2

(12) United States Patent
Lu

(10) Patent No.: US 11,982,418 B2
(45) Date of Patent: May 14, 2024

(54) LIGHTING MODULE FOR A VEHICLE HEADLAMP

(71) Applicant: LUMILEDS LLC, San Jose, CA (US)

(72) Inventor: Kang Lu, Shanghai (CN)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 18/017,592

(22) PCT Filed: Jul. 26, 2021

(86) PCT No.: PCT/US2021/043241
§ 371 (c)(1),
(2) Date: Jan. 23, 2023

(87) PCT Pub. No.: WO2022/020818
PCT Pub. Date: Jan. 27, 2022

(65) Prior Publication Data
US 2023/0280012 A1 Sep. 7, 2023

(30) Foreign Application Priority Data
Jul. 24, 2020 (WO) ................ PCT/CN2020/104018
Aug. 10, 2020 (EP) .................................... 20190252

(51) Int. Cl.
*F21S 41/43* (2018.01)
*F21S 41/24* (2018.01)
(Continued)

(52) U.S. Cl.
CPC ............... *F21S 41/43* (2018.01); *F21S 41/24* (2018.01); *F21S 41/33* (2018.01); *F21W 2102/155* (2018.01); *F21Y 2115/10* (2016.08)

(58) Field of Classification Search
CPC ............. F21S 41/43; F21S 41/24; F21S 41/33
See application file for complete search history.

(56) References Cited

U.S. PATENT DOCUMENTS

| | | | |
|---|---|---|---|
| 10,393,337 | B2 | 8/2019 | Nozue et al. |
| 2008/0225540 | A1 | 9/2008 | Tsukamoto et al. |

(Continued)

FOREIGN PATENT DOCUMENTS

| | | | |
|---|---|---|---|
| CN | 202140942 U | 2/2012 | |
| KR | 2011-0074345 A | 6/2011 | |

(Continued)

OTHER PUBLICATIONS

International Search Report and Written Opinion dated Nov. 8, 2021 for PCT International Application No. PCT/US2021/043241.

(Continued)

*Primary Examiner* — Christopher E Dunay
(74) *Attorney, Agent, or Firm* — Volpe Koenig

(57) ABSTRACT

A lighting module includes a first light source that generates a low beam with a bright/dark cut-off line and a second light source. First optics redirects a first part of light from the first light source to create a main part of the low beam substantially below the bright/dark cut-off line. Second optics is spaced apart from the first optics and redirects a second part of light from the first light source to create a zone III beam of the low beam substantially above the bright/dark cut-off line and redirects a fourth part of light from the second light source to create a concentrated beam of the high beam in front of the vehicle. Third optics redirects a third part of light from the second light source to create a main part of a high beam.

15 Claims, 7 Drawing Sheets

400

(51) Int. Cl.

| | |
|---|---|
| ***F21S 41/33*** | (2018.01) |
| *F21W 102/155* | (2018.01) |
| *F21Y 115/10* | (2016.01) |

(56) References Cited

U.S. PATENT DOCUMENTS

| | | | | |
|---|---|---|---|---|
| 2014/0268848 | A1 | 9/2014 | Tessnow et al. | |
| 2015/0338047 | A1 | 11/2015 | Honda | |
| 2016/0091159 | A1 * | 3/2016 | Puech | F21S 41/143 362/544 |
| 2018/0163939 | A1 | 6/2018 | Chen et al. | |
| 2019/0017670 | A1 | 1/2019 | Zhu et al. | |
| 2020/0003382 | A1 * | 1/2020 | Godderidge | F21S 41/26 |
| 2020/0047660 | A1 * | 2/2020 | Lu | F21S 41/395 |
| 2021/0131635 | A1 * | 5/2021 | Cao | F21S 41/334 |
| 2021/0317966 | A1 * | 10/2021 | Qiu | F21S 41/365 |
| 2022/0170606 | A1 * | 6/2022 | Potter | F21S 41/321 |
| 2022/0282846 | A1 * | 9/2022 | Lu | F21S 41/153 |

FOREIGN PATENT DOCUMENTS

| | | | |
|---|---|---|---|
| KR | 10-1600564 | B1 | 3/2016 |
| WO | 2014/119980 | A1 | 8/2014 |

OTHER PUBLICATIONS

International Preliminary Report on Patentability Chapter I dated Jan. 24, 2023 for PCT International Application No. PCT/US2021/043241.

Extended European Search Report dated Dec. 14, 2020 for European Patent Application No. 20190252.5.

* cited by examiner

LIGHTING MODULE FOR A VEHICLE HEADLAMP

CROSS REFERENCE TO RELATED APPLICATIONS

This application is a § 371 application of International Application No. PCT/US2021/043241, filed Jul. 26, 2021, which claims the benefit of EP Patent Application Number 20190252.5, which was filed on Aug. 10, 2020, and International Application No. PCT/CN2020/104018, which was filed on Jul. 24, 2020, the contents of which are hereby incorporated by reference herein.

BACKGROUND

Reflective type lighting devices have been used in vehicle lighting field, such as for vehicle front-lighting. Reflective type lighting devices for a low beam mode may include a light source, a reflector and a shutter, such as a black shield. The shutter may be used to block a part of light emitted from the light source to avoid glare to drivers of oncoming vehicles, such that the generated low beam is more comfortable and safer to those drivers.

SUMMARY

A lighting module includes a first light source that generates a low beam with a bright/dark cut-off line and a second light source. First optics redirects a first part of light from the first light source to create a main part of the low beam substantially below the bright/dark cut-off line. Second optics is spaced apart from the first optics and redirects a second part of light from the first light source to create a zone III beam of the low beam substantially above the bright/dark cut-off line and redirects a fourth part of light from the second light source to create a concentrated beam of the high beam in front of the vehicle. Third optics redirects a third part of light from the second light source to create a main part of a high beam.

BRIEF DESCRIPTION OF THE DRAWINGS

A more detailed understanding can be had from the following description, given by way of example in conjunction with the accompanying drawings wherein.

DETAILED DESCRIPTION

Figure 1:
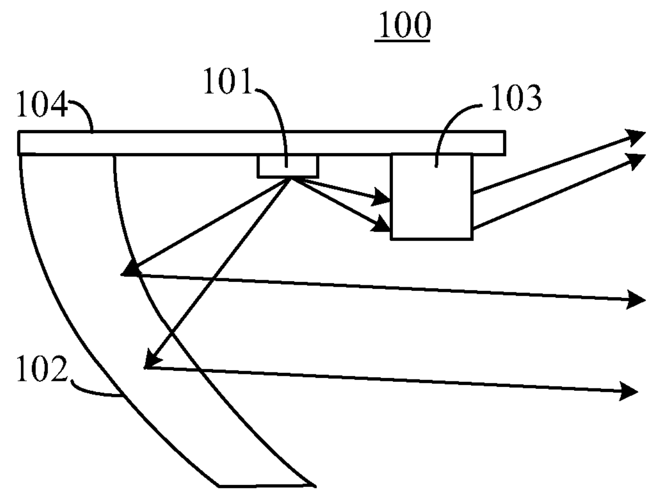
FIG. 1 is a diagram of a lighting module for a vehicle headlamp when operated in a low beam mode.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

The specific requirements for rear lighting are typically defined by car makers, for example, to achieve certain styling goals. However, they may also come from technical aspects, such as the stability of the cover glass requiring a certain thickness. This may pose challenges to rear lighting manufacturers since they have to cope with various requirements specific for every car type. For example, since the materials as well as specifications of the materials may differ among cars, it is difficult for the rear lighting manufacturers to still provide an illumination that meets the specific requirements.

Take the backup luminaire as an example. These luminaires typically include a light source, a housing, and an optical system. The cover may function as the last element of the optical system versus the environment. This transparent element thus shields the inner side of the luminaire versus the environment. Specifications of the material can be different from each other, for instance, thickness of the material might differ. Cover material is usually dyed in the volume, which means a thicker cover will have a stronger color (e.g., more absorption than a thinner cover of the same material). Thus, due to the interaction between a dedicated emission spectrum of the LED and the specific absorption spectrum of the cover, one particular LED can only be applied for a specific material of the cover made from a specific grade of colored plastic as well as a specific range of thicknesses of the cover made from the aforementioned material. In other words, the specific configuration of the LED may depend on the material of the cover as well as the thickness of the cover, which may thus necessitate repeated new configurations of the LED for different car manufacturers.

The use of a shutter, such as described above, may result in light loss of the light source, thereby reducing the utilization efficiency of the light source. In addition, a separate surface structure may need to be designed on the reflector to generate a zone III beam (i.e., a part of the low beam located mainly above the bright/dark boundary), which may be necessary for the low beam and which surface structure may occupy a part of the physical space of the reflector. Such separate surface structure may complicate the reflector and may deteriorate the optical performance of the reflector for the low beam outside of zone III. Therefore, there may be a need for an improved lighting device for the vehicle headlamp, which may both avoid glare and generate the zone III beam of the low beam, which may not require a separate surface structure on the reflector and may not require a shutter capable of avoiding glare.

FIG. 1 is a diagram of a lighting module 100 for a vehicle headlamp when operated in a low beam mode. The lighting module 100 comprises a first light source 101, a first optics 102, and a second optics 103 spaced apart from the first optics 102. The first light source 101 may be any suitable light source, such as an LED, which is not limited herein. As shown in FIG. 1, light emitted by the first light source 101 can be considered to be divided into two parts, such as a first part and a second part. The first part of light emitted from the first light source 101 may be incident onto the first optics 102, which may then redirect the light incident thereon towards infinity, such as towards a road in front of the vehicle, to form a main part of the low beam. The second part of light emitted from the first light source 101 may be incident onto the second optics 103, which may then redirect the light incident thereon also towards infinity, such as towards the road in front of the vehicle, to form a zone III beam of the low beam. The main part of the low beam and the zone III beam of the low beam may together constitute the eventual low beam as projected onto the road in front of the vehicle.

The term "zone Ⅲ beam," as used herein, is a common term in the art, which refers to a wide beam that is essential for the low beam according to UN ECE R112 Low Beam Regulation. For example, when a vehicle is driving on a road without street lights in low beam mode at night, if there is no zone Ⅲ beam of the low beam, it may be difficult for the driver of the vehicle to see obstacles, such as branches of tree or signs over the road in front of the vehicle, which may make them prone to traffic accidents. With the zone Ⅲ beam of the low beam, the obstacles over the road can be illuminated so as to avoid potential dangers.

The first light source may be any suitable light source, including, but not limited to, a light emitting diode (LED). The meaning of the term "redirect" used herein includes but is not limited to reflection, refraction, deflection, transmission, which depends on the specific types of the first and second optics.

It should be noted that there are no specific limitations for the material of the second optics, as long as the second optics is designed such that the second part of light redirected by the second optics is capable of creating the zone Ⅲ beam of the low beam in front of the vehicle.

Figure 5A:
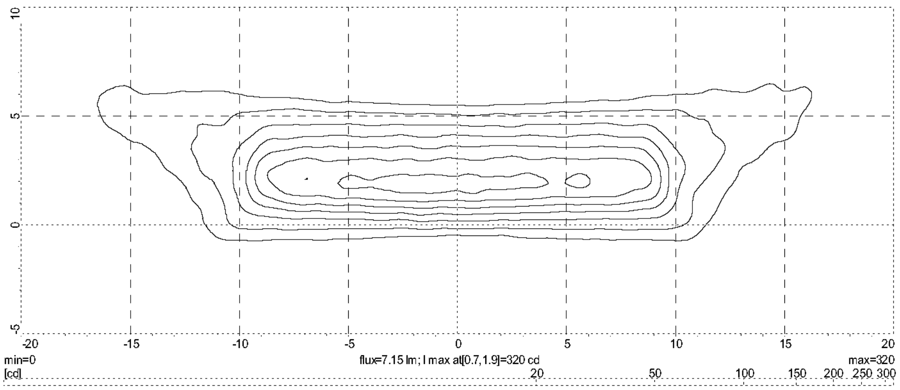
FIG. 5*a* is a simulation diagram for only a zone III beam pattern.
Figure 5B:
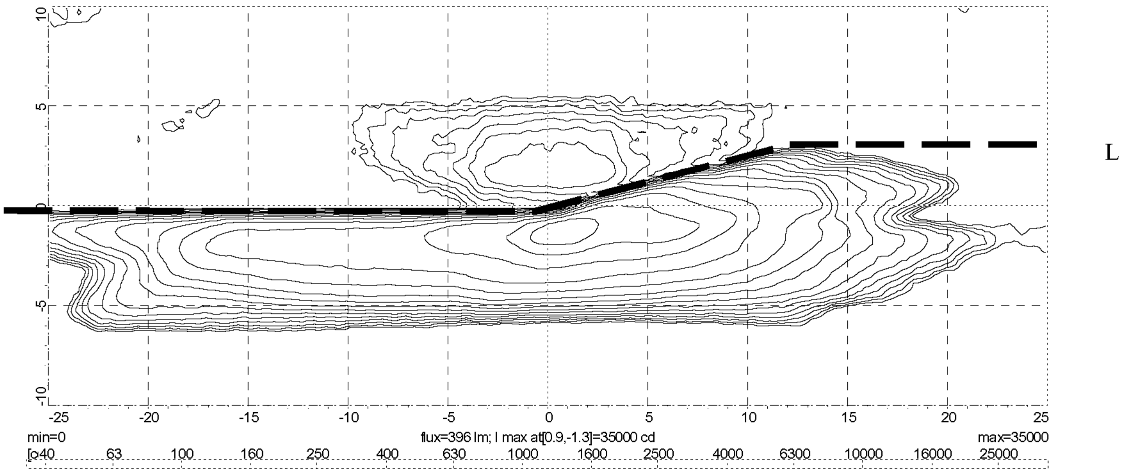
FIG. 5*b* is a simulation diagram for a low beam pattern comprising the zone III beam pattern and the main part of the low beam generated by the lighting module.
Figure 5C:
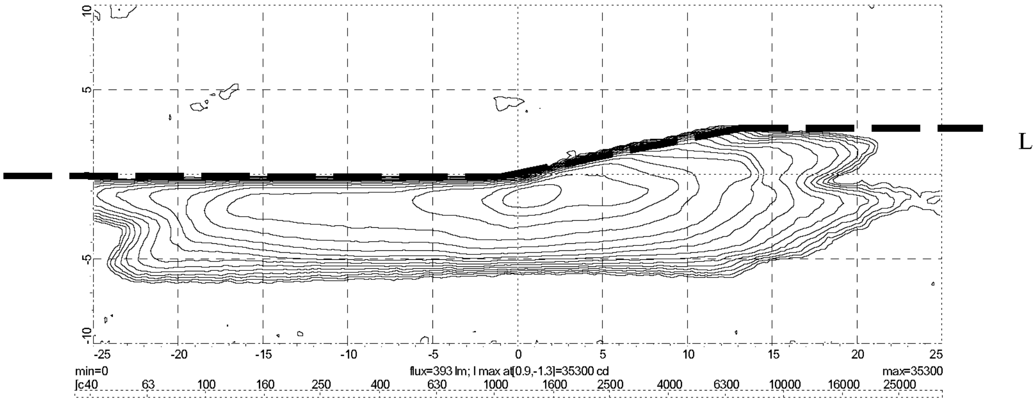
FIG. 5*c* is a simulation diagram for a low beam pattern without the zone III beam.

FIG. 5*a* is a simulation diagram for only a zone III beam pattern. FIG. 5*b* is a simulation diagram for a low beam pattern comprising the zone III beam pattern and the main part of the low beam generated by the lighting module 100. FIG. 5*c* is a simulation diagram for a low beam pattern without the zone III beam. As shown in FIG. 5*b*, the low beam pattern comprises a bright/dark cut-off line (L), the zone Ⅲ beam pattern is a wide beam pattern and mainly above the bright/dark cut-off line (L), and the main part of the low beam is mainly below the bright/dark cut-off line (L). As compared to a low beam pattern without the zone Ⅲ beam as shown in FIG. 5*c*, the low beam pattern as shown in FIG. 5*b* may further improve the safety of driving.

Referring again to FIG. 1, the lighting module 100 may further comprise a substrate 104. The first light source 101, the first optics 102 and the second optics 103 may be attached to a same surface of the substrate 104, and the first light source 101 may be between the first optics 102 and the second optics 103. In some embodiments, the second optics 103 may be screwed or glued to the substrate 104. In some embodiments, the substrate 104 may be a printed circuit board for powering the first light source 101. In this way, the substrate may provide support for the first light source, the first optics and the second optics and power for the first light source, which may enable a compact system.

With the lighting module 100 for the vehicle headlamp, the second optics 103 may replace the conventional shutter for eliminating glare (such as a black shield) and, hence, may reuse light, that would otherwise be blocked by the shutter, to create the zone Ⅲ beam of the low beam. In this way, the glare may be eliminated and the utilization efficiency of the first light source 101 may be improved with the second optics 103. In addition, as compared to a conventional lighting module comprising a separate surface structure of a reflector for generating the zone III beam, the lighting module 100 described herein may improve the low beam performance and simplify the system.

Figure 2:
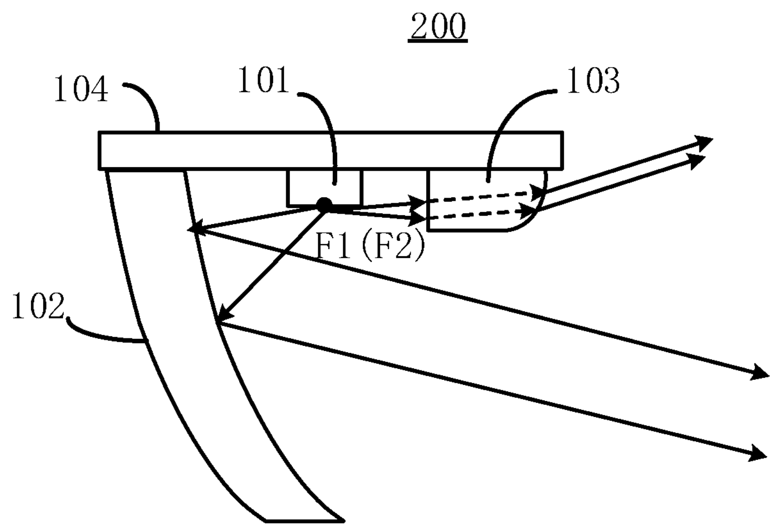
FIG. 2 is a diagram of a lighting module for a vehicle headlamp when operated in a low beam mode.
Figure 3:
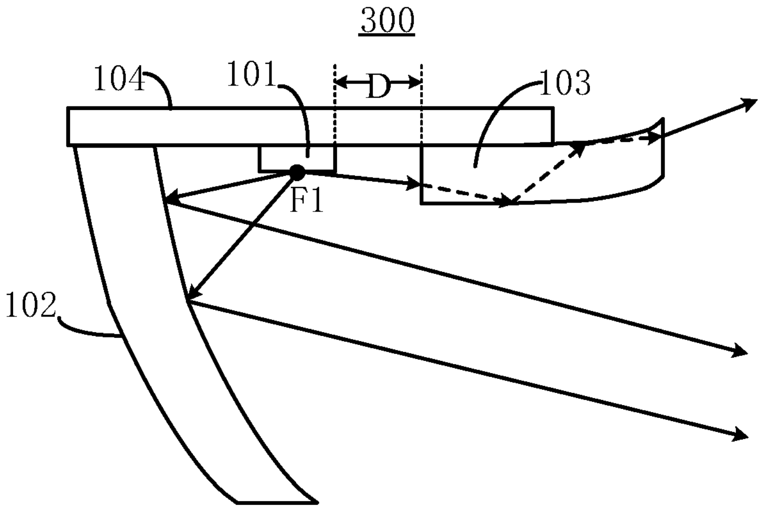
FIG. 3 is a diagram of a lighting module for a vehicle headlamp when operated in a low beam mode.
Figure 4:
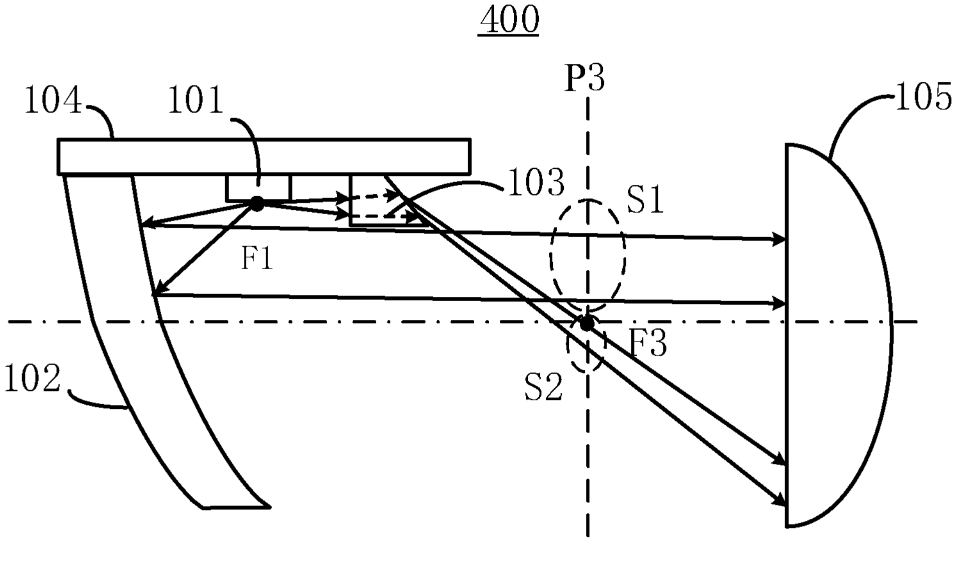
FIG. 4 is a diagram of another example of a lighting module for creating the low beam comprising the zone Ⅲ beam.

FIGS. 2-4 are variations of the lighting module 100 as shown in FIG. 1, where the same reference numerals are used to indicate the same components as in the lighting module 100 of FIG. 1. In general, the lighting modules as shown in FIGS. 2-4 also comprise the first light source 101, the first optics 102, the second optics 103, and the substrate 104. The lighting modules will be described in detail below with reference to FIGS. 2-4.

FIG. 2 is a diagram of a lighting module 200 for a vehicle headlamp when operated in a low beam mode. In the lighting module 200 illustrated in FIG. 2, the first optics 102 is a reflector and the second optics 103 is a lens.

In some embodiments, the first optics 102 may be a parabolic reflector with a curved reflecting surface and with a first focal point F1. The parabolic reflector can be understood as a reflector whose reflecting surface is formed by revolutions of a parabola. The first optics 102 may receive and reflect the first part of light from the first light source 101 to create the main part of the low beam in front of the vehicle. The parabolic reflector may have optical characteristics such that when a light source, such as a point light source, is disposed at its focal point, most of light emitted by the light source may exit towards infinity parallel to the main axis of the reflector after being reflected by the reflector. Alternatively or additionally, the parabolic reflector may have optical characteristics such that when the light emitted by a light source parallel to the main axis of the reflector is projected onto the reflecting surface of the reflector, most of the light may focus on its focal point after being reflected by the reflector. It should be noted that the parabolic reflector is only a specific example of the first optics 102, and the embodiments described herein are not intended to limit the specific forms of the first optics 102, as long as it is capable of generating the main part of the low beam in front of the vehicle.

In some embodiments, the second optics 103 may be a lens with a second focal point F2, which may coincide with the first focal point F1 of the first optics 102. The second optics 103 may receive and refract the second part of light from the first light source 101 to create the zone Ⅲ beam of the low beam in front of the vehicle. The second optics 103 may have similar characteristics to the first optics 102 described above. For example, light rays parallel to the optical axis of the second optics 103 may be concentrated at the second focal point F2 of the second optics 103 after being refracted by the second optics 103. For another example, light rays emitted from the second focal point F2 of the second optics 103 may exit parallel to the optical axis of the second optics 103 after being refracted by the second optics 103.

The first light source 101 may coincide with the first focal point F1 of the first optics 102 and the second focal point F2 of the second optics 103. With such an arrangement, the first part of light from the first light source 101 may substantially become parallel light rays after being reflected by the first optics 102, and the second part of light from the first light source 101 also may substantially become parallel light rays after being refracted by the second optics 103. Parallel light rays have a small divergence angle, which may facilitate the projection of light redirected by the first and second optics to infinity, such as onto the road in front of the vehicle, to form the low beam.

FIG. 3 is a diagram of a lighting module 300 fora vehicle headlamp when operated in a low beam mode. In the lighting module 300 illustrated in FIG. 3, the first optics 102 is a reflector and the second optics 103 is a light guide. Like the lighting module 200 shown in FIG. 2, the first optics 102 in FIG. 3 may be a reflector with the first focal point F1, and the first light source 101 may be positioned at the first focal point F1 of the first optics 102.

In embodiments, the second optics 103 may be a light guide with a light incident surface and a light exit surface. The second part of light from the first light source 101 may enter the light guide via its light incident surface and then be deflected (such as totally reflected) in the interior of the light guide along its length direction and may finally exit the light guide via its light exit surface to create the zone Ⅲ beam of the low beam in front of the vehicle. A distance D between the first light source 101 and the light incident surface of the light guide may be designed to enable most of the second part of light from the first light source 101 to enter the light guide via its light incident surface. For example, the distance D between the first light source 101 and the light incident surface of the light guide may be in a range of 0 mm to 3 mm, realizing a higher utilization efficiency of light from the first light source 101.

FIG. 4 is a diagram of another example of a lighting module for creating the low beam comprising the zone Ⅲ beam. In the example illustrated in FIG. 4, an additional component (e.g., a fourth optics 105, is further included in the lighting module 400 of FIG. 4. The fourth optics 105 may be positioned at an optically downstream location for the first optics 102 and the second optics 103. In the illustrated example, the fourth optics 105 is a projection lens with a focal plane P3 and a third focal point F3 thereon, and the focal plane P3 is between the second optics 103 and the fourth optics 105. An example operation principle of the lighting module 400 is described in detail below with reference to FIG. 4.

The first optics 102 may receive the first part of light from the first light source 101 and redirect it towards a first area S1 (shown with a dotted ellipse) on the focal plane P3. The second optics 103 may receive the second part of light from the first light source 101 and redirect it towards a second area S2 (shown with a dotted ellipse) that is below the first area S1 on the focal plane P3. In this way, the first part and the second part of light coming originally from the first light source 101 may be incident onto two different sections of the third optics 105, such as an upper section of the third optics 105 corresponding to the first part of light and a lower section of the third optics 105 corresponding to the second part of light. With the further redirection of the third optics 105, the first part of light originally from the first light source 101 may be projected below the bright/dark cut-off line (L) to form the main part of the low beam, and the second part of light originally from the first light source 101 may be projected above the bright/dark cut-off line (L) to form the zone Ⅲ beam of the low beam.

In some embodiments, the first optics 102 may be a reflector with a first focal point F1, and the first light source 101 may be arranged at the first focal point F1 of the reflector. The second optics 103 may be any suitable optics such as a lens or a light guide. With the fourth optics 105, the lighting module 400 may provide more design freedom.

The embodiments described above are described with respect to operation in low beam mode. However, in some embodiments, the lighting modules may also be used in a high beam mode, which is described in detail below with reference to FIGS. 6-8. For the sake of clarity, in the lighting modules shown in FIGS. 6 and 7, the first light source 101 and the first optics 102 have been omitted, but this is not intended to be a limitation to the embodiments described herein.

Figure 6:
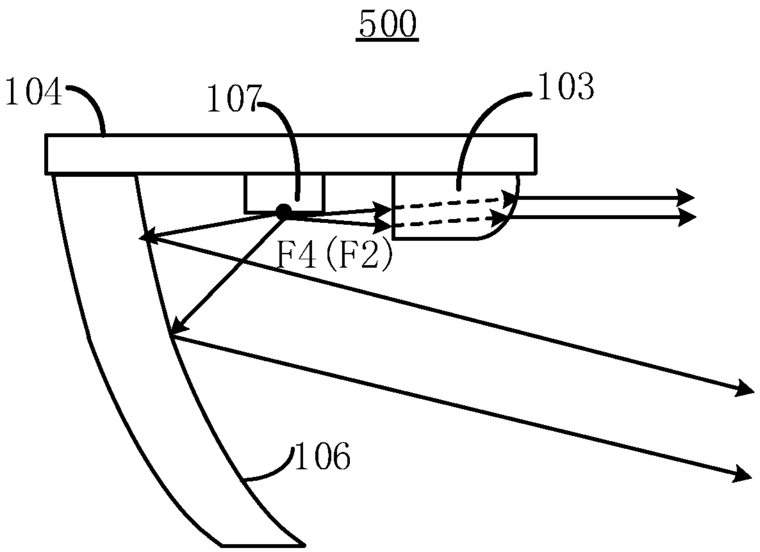
FIG. 6 is a diagram of a lighting module that further comprises a third optics and a second light source.

FIG. 6 is a diagram of a lighting module 500 that further comprises a third optics 106 and a second light source 107. The second light source 107 may be used to generate a high beam and may be different from or the same as the first light source 101. For example, when a vehicle comprising the lighting module 500 is driving in the high beam mode, the second light source 107 may be turned on and the first light source 101 may be turned off. The third optics 106 may receive a third part of light from the second light source 107 and redirect it towards infinity to create a main part of the high beam in front of the vehicle. Meanwhile, the second optics 103 may receive a fourth part of light from the second light source 107 and redirect it towards infinity to create a concentrated beam of the high beam in front of the vehicle. The main part of the high beam and the concentrated beam of the high beam may together constitute the eventual high beam as projected onto the road in front of the vehicle.

In some embodiments, the first and second light sources may be separate light sources, and in some embodiments may be two sub-light sources of one light source. The first and second light sources may be same or different, which is not limited herein.

The first optics and the third optics may be designed such that they do not interfere with each other optically. That is, light emitted from the first light source in the low beam mode may illuminate only onto the first optics without illuminating onto the third optics, and light emitted from the second light source in the high beam mode may illuminate only onto the third optics without onto the first optics. In some embodiments, there may be a shield between the first optics and the third optics to further avoid potential optical crosstalk.

Figure 8A:
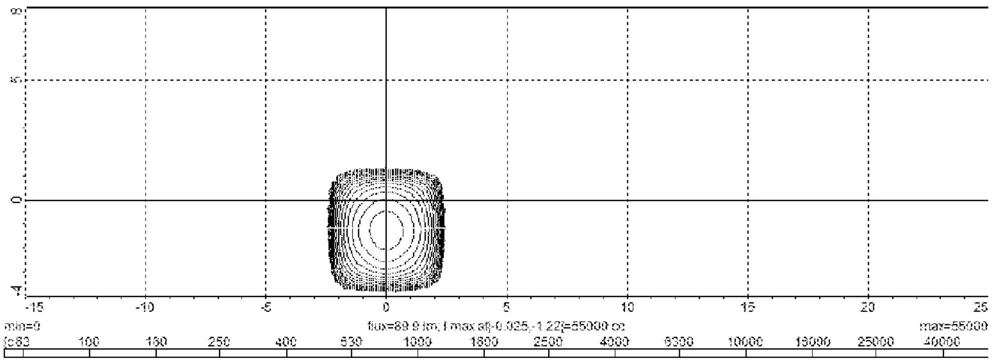
FIGS. 8*a* and 8*b* are simulation diagrams, respectively, for a concentrated beam and the eventual high beam comprising the concentrated beam and the main part of the high beam.
Figure 8B:
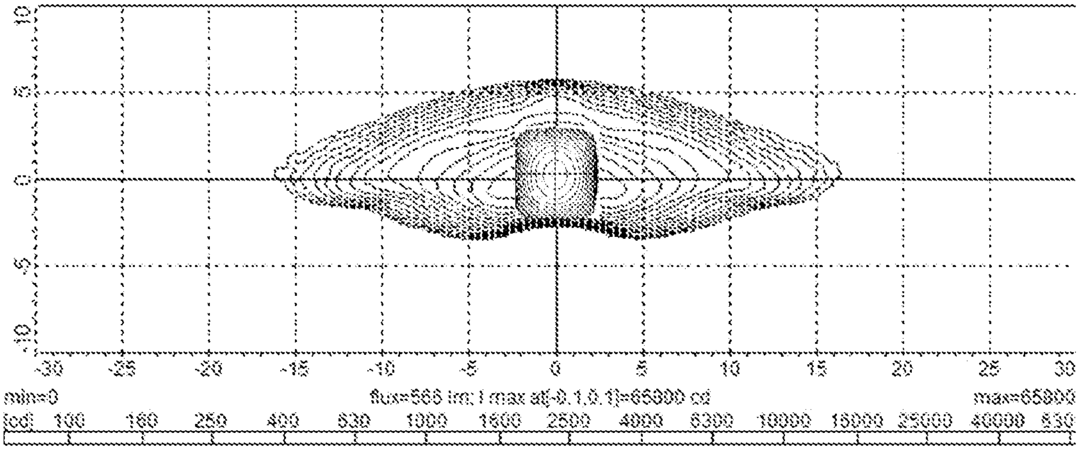

FIGS. 8*a* and 8*b* are simulation diagrams, respectively, for a concentrated beam and the eventual high beam comprising the concentrated beam and the main part of the high beam. It should be noted that the relative positional relationship of the concentrated beam and the main part of the high beam as shown in FIG. 8*b* is only an example, which should not be considered as a limitation to the embodiments described herein. For example, the concentrated beam may be near the edge of the main part of the high beam.

Referring again to FIG. 6, the third optics 106 may be a reflector with a fourth focal point F4, which may be similar to the first optics 102 as shown in FIG. 2. The second optics 103 may be the same as that shown in FIG. 2. In such a case, the second light source 107 may coincide with the fourth focal point F4 of the third optics 106 and the second focal point F2 of the second optics 103. Alternatively, the second optics 103 may also be a light guide as shown in FIG. 3. For specific details, reference may be made to the embodiments described in connection with FIGS. 2 and 3, and they are not repeated herein for the sake of brevity.

As can be seen, the second optics 103 may also be used in the high beam mode to create a concentrated beam, thereby improving the luminous intensity or illumination range of the high beam as projected onto the road in front of the vehicle and optimizing values of some test points for the high beam.

Figure 7:
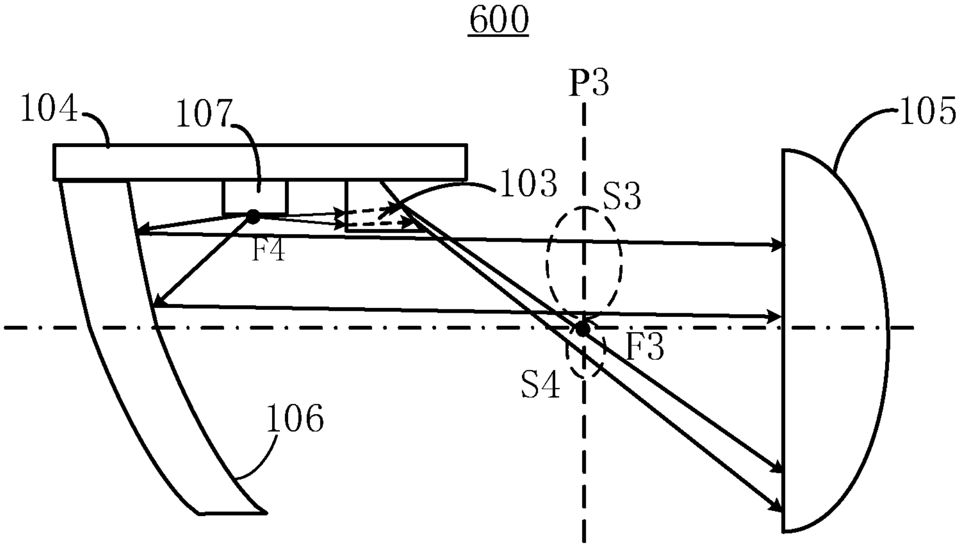
FIG. 7 is a diagram of an alternative for a lighting module for creating the high beam comprising the concentrated beam.

FIG. 7 is a diagram of an alternative for a lighting module for creating the high beam comprising the concentrated beam. As shown, the fourth optics 105 as mentioned above can also be used in the lighting module 600. For example, when the lighting module 600 is operated in the high beam mode, the third optics 106 may receive and redirect the third part of light from the second light source 107 to a third area S3 (shown with a dotted ellipse) on the focal plane P3, and, meanwhile, the second optics 103 may receive and redirect the fourth part of light from the second light source 107 to a fourth area S4 (shown with a dotted ellipse), which is below the third area S3 on the focal plane F3. The fourth optics 105 may receive light from the third area S3 and light from the fourth area S4 on the focal plane P3 and then respectively redirect them towards infinity, such as towards the road in front of the vehicle, to create the main part of the high beam and the concentrated beam of the high beam, respectively.

As seen, a low beam system comprising the first light source 101 and the first optics 102 as well as a high beam system comprising the second light source 107 and the third optics 106 may share the second optics 103 (and optionally the fourth optics 105) to create the low beam or the high beam as desired.

Figure 9:
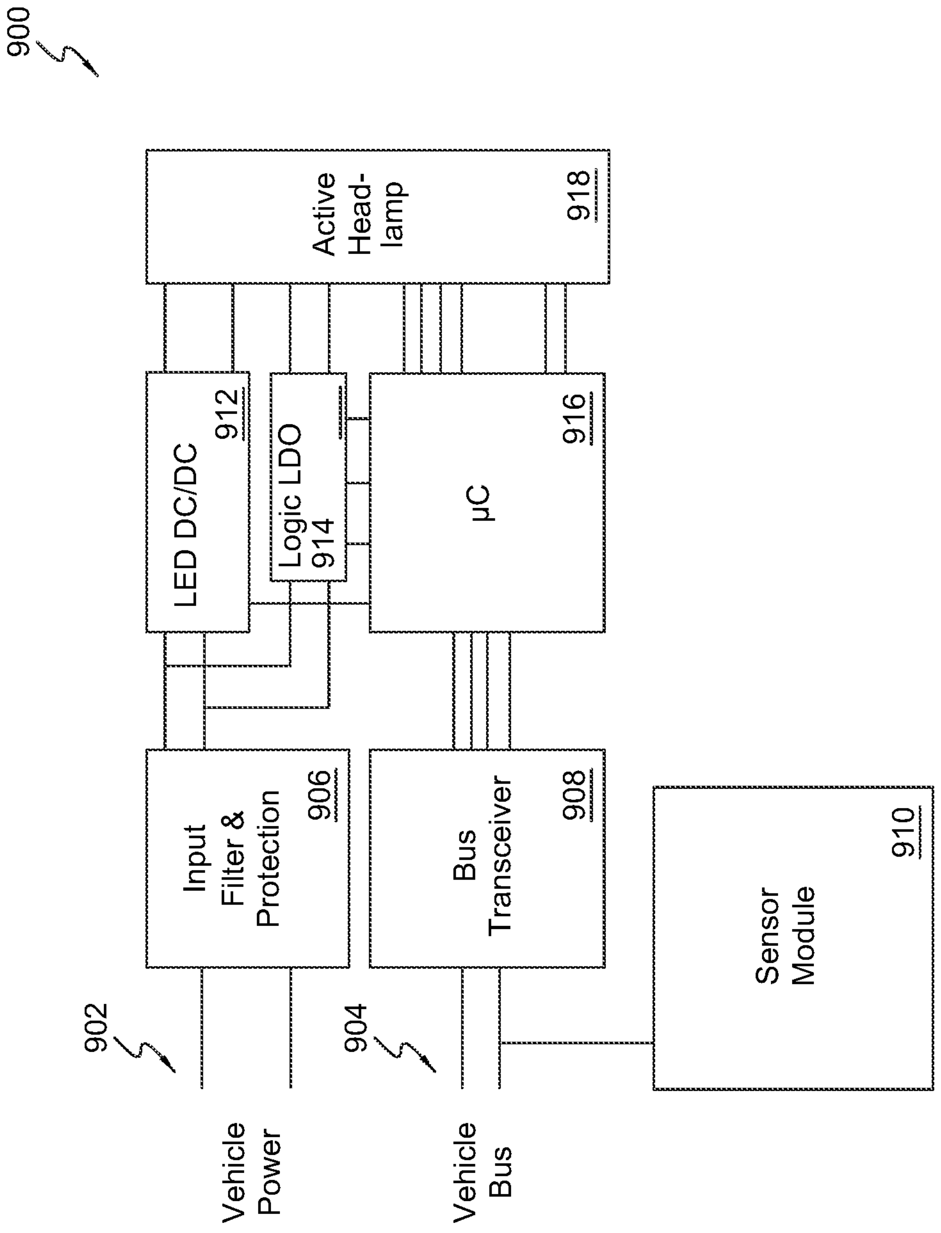
FIG. 9 is a diagram of an example vehicle headlamp system.

FIG. 9 is a diagram of an example vehicle headlamp system 900 that may incorporate one or more of the embodiments and examples described herein. The example vehicle headlamp system 900 illustrated in FIG. 9 includes power lines 902, a data bus 904, an input filter and protection module 906, a bus transceiver 908, a sensor module 910, an LED direct current to direct current (DC/DC) module 912, a logic low-dropout (LDO) module 914, a micro-controller 916 and an active head lamp 918.

The power lines 902 may have inputs that receive power from a vehicle, and the data bus 904 may have inputs/outputs over which data may be exchanged between the vehicle and the vehicle headlamp system 900. For example, the vehicle headlamp system 900 may receive instructions from other locations in the vehicle, such as instructions to turn on turn signaling or turn on headlamps, and may send feedback to other locations in the vehicle if desired. The sensor module 910 may be communicatively coupled to the data bus 904 and may provide additional data to the vehicle headlamp system 900 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 900. In FIG. 9, the headlamp controller may be a micro-controller, such as micro-controller (pc) 916. The micro-controller 916 may be communicatively coupled to the data bus 904.

The input filter and protection module 906 may be electrically coupled to the power lines 902 and may, for example, support various filters to reduce conducted emissions and provide power immunity. Additionally, the input filter and protection module 906 may provide electrostatic discharge (ESD) protection, load-dump protection, alternator field decay protection, and/or reverse polarity protection.

The LED DC/DC module 912 may be coupled between the input filter and protection module 906 and the active headlamp 918 to receive filtered power and provide a drive current to power LEDs in the LED array in the active headlamp 918. The LED DC/DC module 912 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 914 may be coupled to the input filter and protection module 906 to receive the filtered power. The logic LDO module 914 may also be coupled to the micro-controller 916 and the active headlamp 918 to provide power to the micro-controller 916 and/or electronics in the active headlamp 918, such as CMOS logic.

The bus transceiver 908 may have, for example, a universal asynchronous receiver transmitter (UART) or serial peripheral interface (SPI) interface and may be coupled to the micro-controller 916. The micro-controller 916 may translate vehicle input based on, or including, data from the sensor module 910. The translated vehicle input may include a video signal that is transferrable to an image buffer in the active headlamp 918. In addition, the micro-controller 916 may load default image frames and test for open/short pixels during startup. In embodiments, an SPI interface may load an image buffer in CMOS. Image frames may be full frame, differential or partial frames. Other features of micro-controller 916 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 10:
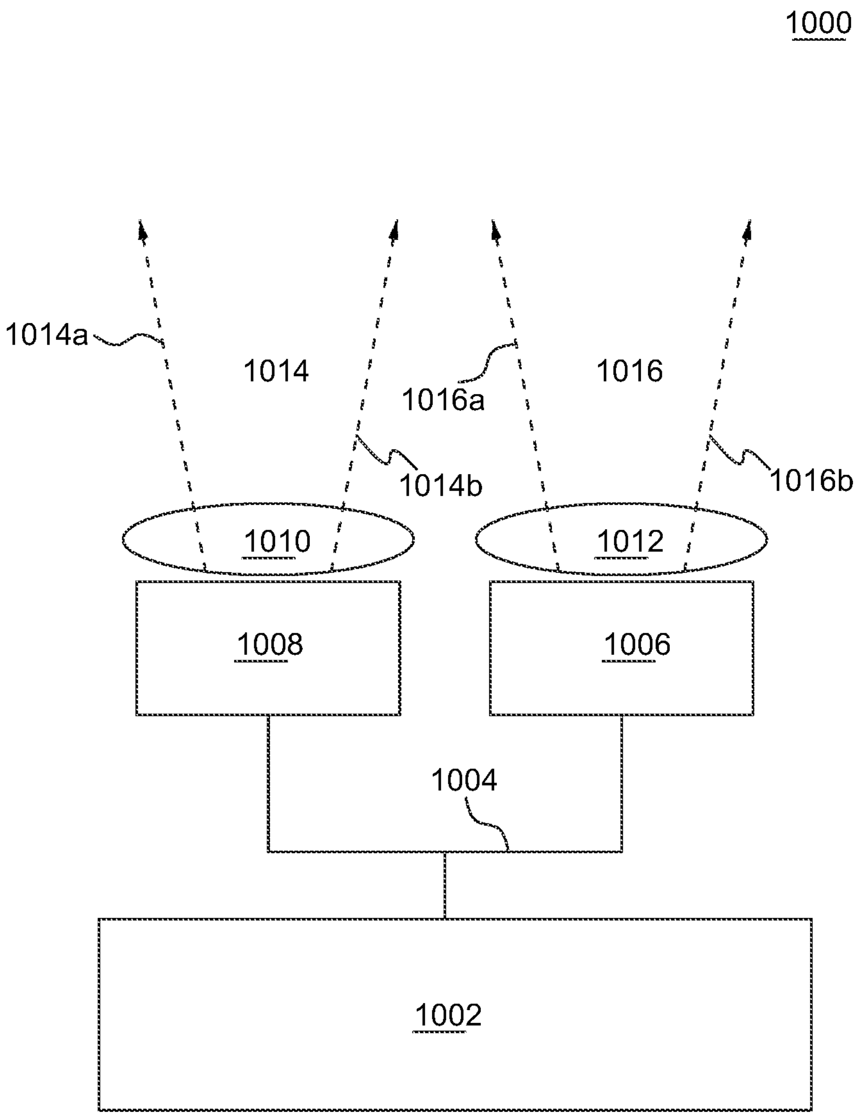
FIG. 10 is a diagram of another example vehicle headlamp system.

FIG. 10 is a diagram of another example vehicle headlamp system 1000. The example vehicle headlamp system 1000 illustrated in FIG. 10 includes an application platform 1002, two LED lighting systems 1006 and 1008, and secondary optics 1010 and 1012.

The LED lighting system 1008 may emit light beams 1014 (shown between arrows 1014*a* and 1014*b* in FIG. 10). The LED lighting system 1006 may emit light beams 1016 (shown between arrows 1016*a* and 1016*b* in FIG. 10). In the embodiment shown in FIG. 10, a secondary optic 1010 is adjacent the LED lighting system 1008, and the light emitted from the LED lighting system 1008 passes through the secondary optic 1010. Similarly, a secondary optic 1012 is adjacent the LED lighting system 1006, and the light emitted from the LED lighting system 1006 passes through the secondary optic 1012. In alternative embodiments, no secondary optics 1010/1012 are provided in the vehicle headlamp system.

Where included, the secondary optics 1010/1012 may be or include one or more light guides. The one or more light guides may be edge lit or may have an interior opening that defines an interior edge of the light guide. LED lighting systems 1008 and 1006 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 1008 and 1006 in a desired manner, such as, for example, with a gradient, a chamfered distribution, a narrow distribution, a wide distribution, or an angular distribution.

The application platform 1002 may provide power and/or data to the LED lighting systems 1006 and/or 1008 via lines 1004, which may include one or more or a portion of the power lines 902 and the data bus 904 of FIG. 9. One or more sensors (which may be the sensors in the vehicle headlamp system 1000 or other additional sensors) may be internal or external to the housing of the application platform 1002. Alternatively, or in addition, as shown in the example vehicle headlamp system 900 of FIG. 9, each LED lighting system 1008 and 1006 may include its own sensor module, connectivity and control module, power module, and/or LED array.

In embodiments, the vehicle headlamp system 1000 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 1006 and 1008 may be sensors (e.g., similar to sensors in the sensor module 910 of FIG. 9) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A lighting module for a vehicle headlamp, comprising a first light source configured to generate a low beam with a bright/dark cut-off line as projected in front of the vehicle;

a second light source;

a first optics configured to receive and redirect a first part of light from the first light source to create a main part of the low beam in front of the vehicle substantially below the bright/dark cut-off line;

a second optics spaced apart from the first optics and configured to receive and redirect a second part of light from the first light source to create a zone III beam of the low beam substantially above the bright-dark cut-off line in front of the vehicle and to receive and redirect a fourth part of light from the second light source to create a concentrated beam of the high beam in front of the vehicle; and a third optics configured to receive and redirect a third part of light from the second light source to create a main part of a high beam in front of the vehicle.

2. The lighting module for the vehicle headlamp according to claim 1, wherein the first optics comprises a reflector with a first focal point, and the first light source is arranged at the first focal point of the reflector.

3. The lighting module for the vehicle headlamp according to claim 2, wherein the second optics is selected from a group consisting of a lens and a light guide.

4. The lighting module for the vehicle headlamp according to claim 3, wherein the second optics is a lens with a second focal point which coincides with the first focal point of the reflector.

5. The lighting module for the vehicle headlamp according to claim 3, wherein:

the second optics is a light guide with a light incident surface and a light exit surface, and a distance between the first light source and the light incident surface of the light guide is configured such that the second part of light from the first light source enters the light guide via the light incident surface of the light guide and exits the light guide via the light exit surface of the light guide to create the zone III beam of the low beam in front of the vehicle.

6. The lighting module for the vehicle headlamp according to claim 5, wherein the distance between the first light source and the light incident surface of the light guide is in a range of 0 mm to 3 mm.

7. The lighting module for the vehicle headlamp according to claim 1, further comprising a substrate, wherein the first light source, the first optics and the second optics are attached to a same surface of the substrate, such that the first light source is between the first optics and the second optics.

8. The lighting module for the vehicle headlamp according to claim 7, wherein the second optics is screwed or glued to the substrate.

9. The lighting module for the vehicle headlamp according to claim 7, wherein the substrate comprises a printed circuit board for powering the first light source.

10. The lighting module for the vehicle headlamp according to claim 1, wherein the zone III beam of the low beam is a wide beam that is essential for the low beam according to UN ECE R112 Low Beam.

11. A lighting module for a vehicle headlamp, the lighting module comprising:

a first light source configured to generate a low beam with a bright/dark cut-off line as projected in front of the vehicle;

a second light source;

a first optics configured to receive and redirect a first part of light from the first light source to create a main part of the low beam in front of the vehicle substantially below the bright/dark cut-off line;

a second optics spaced apart from the first optics and configured to receive and redirect a second part of light from the first light source to create a zone III beam of the low beam substantially above the bright-dark cut-off line in front of the vehicle and to receive and redirect a fourth part of light from the second light source to create a concentrated beam of the high beam in front of the vehicle;

a third optics configured to receive and redirect a third part of light from the second light source to create a main part of a high beam in front of the vehicle; and a fourth optics with a focal plane between the second optics and the fourth optics, wherein:

the first optics is configured to receive and redirect the first part of light from the first light source to a first area on the focal plane, the second optics is configured to receive and redirect the second part of light from the first light source to a second area on the focal plane, and the fourth optics is configured to receive and redirect light from the first area on the focal plane to create the main part of low beam in front of the vehicle and light from the second area on the focal plane to create the zone III beam of the low beam in front of the vehicle.

12. The lighting module for the vehicle headlamp according to claim 11, wherein the fourth optics comprises a projection lens.

13. A lighting module for a vehicle headlamp, the lighting module comprising:

a first light source configured to generate a low beam with a bright/dark cut-off line as projected in front of the vehicle;

a second light source;

a first optics configured to receive and redirect a first part of light from the first light source to create a main part of the low beam in front of the vehicle substantially below the bright/dark cut-off line;

a second optics spaced apart from the first optics and configured to receive and redirect a second part of light from the first light source to create a zone III beam of the low beam substantially above the bright-dark cut-off line in front of the vehicle and to receive and redirect a fourth part of light from the second light source to create a concentrated beam of the high beam in front of the vehicle; and a reflector having a fourth focal point and configured to receive and redirect a third part of light from the second light source to create a main part of a high beam in front of the vehicle, wherein:

the third optics comprises a reflector with a fourth focal point, the second optics is a lens with a second focal point which coincides with the fourth focal point of the reflector, and the second light source is arranged at the fourth focal point of the reflector.

14. The lighting module for the vehicle headlamp according to claim 13, further comprising a fifth optics with a focal plane between the second optics and the fifth optics, wherein:

the third optics is configured to receive and redirect the third part of light from the second light source to a third area on the focal plane, the second optics is configured to receive and redirect the fourth part of light from the second light source to a fourth area on the focal plane, and the fifth optics is configured to receive and redirect light from the third area on the focal plane to create the main part of the high beam in front of the vehicle and light from the fourth area on the focal plane to create the concentrated beam of the high beam in front of the vehicle.

15. The lighting module for the vehicle headlamp according to claim 14, wherein the fifth optics comprises a projection lens.

* * * * *